United States Patent Office 3,452,612
Patented July 1, 1969

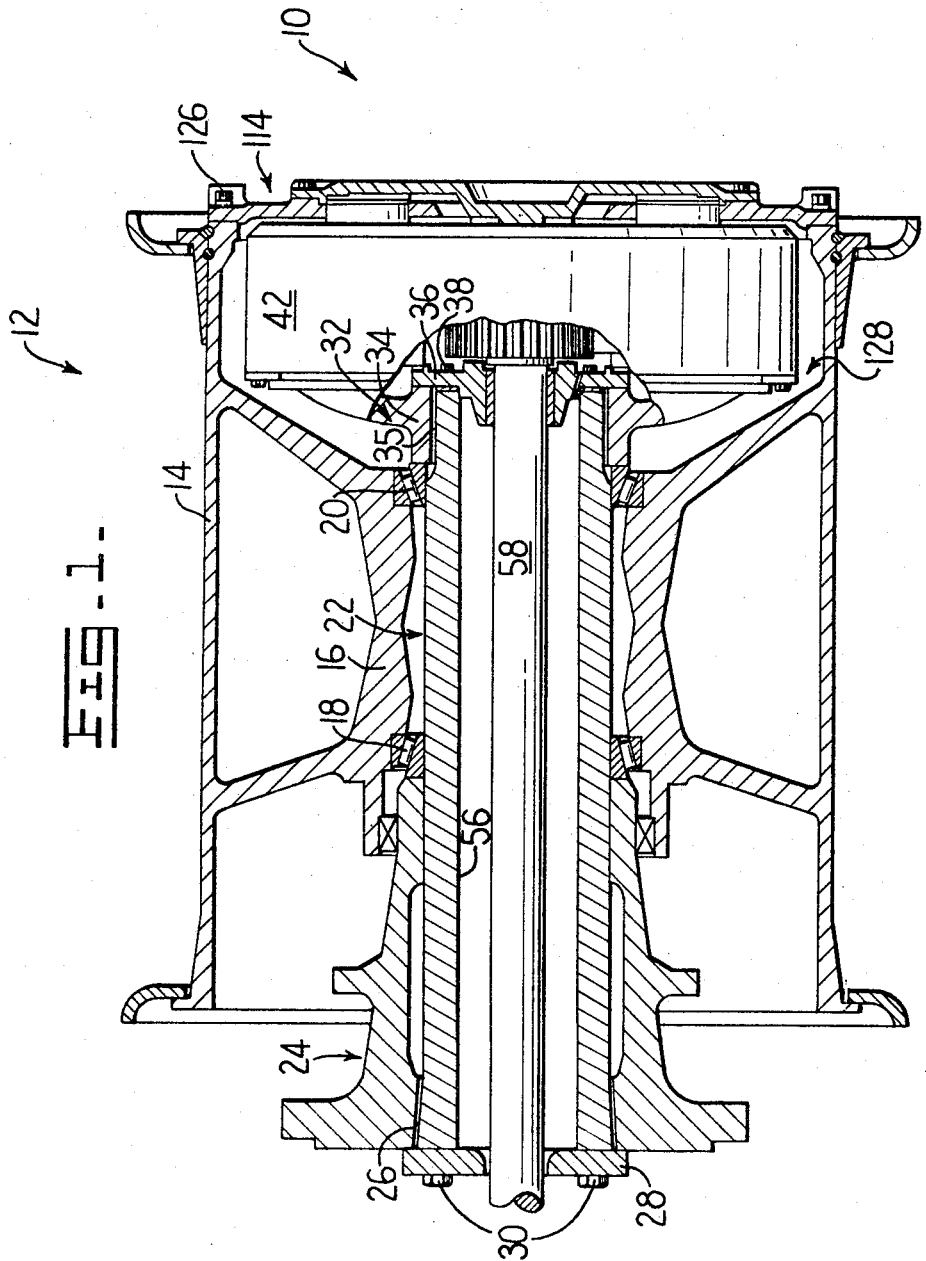

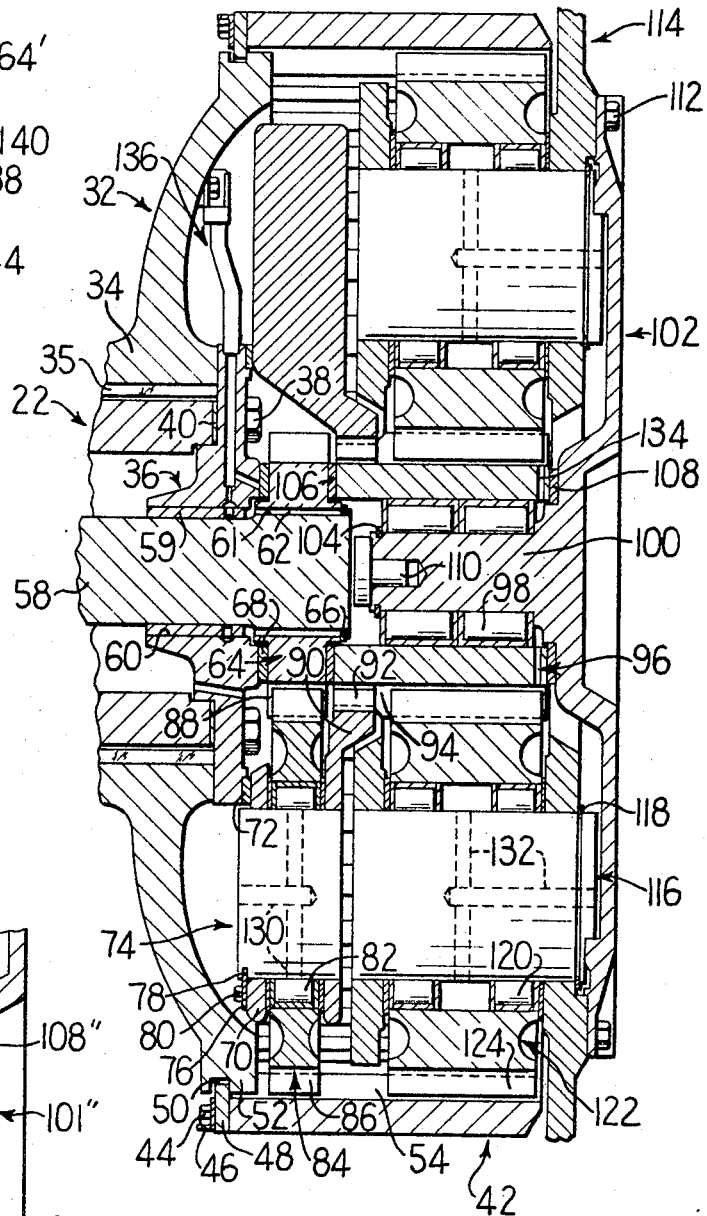
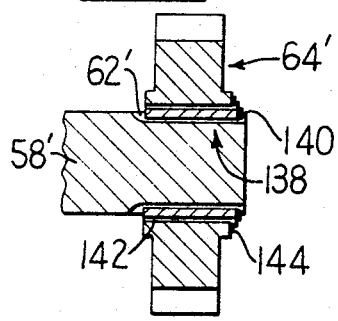
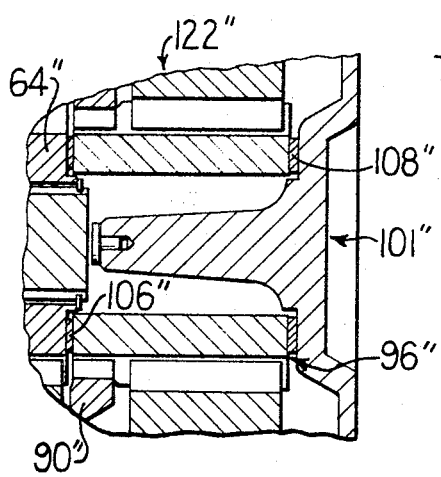

3,452,612
WHEEL DRIVE MECHANISM
Robert Casey, Washington, Ill., assignor to Caterpillar Tractor Co., Peoria, Ill., a corporation of California
Filed Sept. 6, 1967, Ser. No. 665,819
Int. Cl. F16h *35/18, 1/28*
U.S. Cl. 74—391                                      2 Claims

ABSTRACT OF THE DISCLOSURE

A wheel drive mechanism in which two sun gears and two respectively associated sets of planet gears are mounted within a non-rotatable internal ring gear, one sun gear being rotatable by a driven axle shaft, the other sun gear being rotatable by a carrier for the planet gears associated with the one sun gear, a carrier for the planet gears associated with the other sun gear being securable to a wheel assembly for rotation of the latter.

---

Wheel drive mechanisms have been employed in the prior art for the driving of the wheels of automotive vehicles such as tractors. Such known wheel drive mechanisms have usually been of the multiple planetary type and have exhibited numerous disadvantages. For example, the known mechanisms have usually been quite bulky in size and have been comparatively difficult to inspect and service. Furthermore, these mechanisms have had an unusually great susceptibility to damage. In addition, it has usually been necessary to disassemble any of the known wheel drive mechanisms, when removed from the associated vehicle, for transportation purposes.

The present invention is designed to overcome the above discussed disadvantages of the wheel drive mechanisms of the prior art. The advantages of the invention will become apparent to one skilled in the art from the following description thereof when read in conjunction with the accompanying drawings in which:

FIG. 1 is a vertical cross-sectional view being partly broken away of a wheel assembly and associated supporting and axle shaft structure, a wheel drive mechanism of the invention being shown mounted within the wheel assembly;

FIG. 2 is an enlarged vertical cross-sectional view of the wheel drive mechanism of FIG. 1, together with portions of the associated supporting and axle shaft structure;

FIG. 3 is a fragmentary cross-sectional view illustrating a modification in the structure of the wheel drive mechanism of FIG. 2; and FIG. 4 is a fragmentary cross-sectional view illustrating a further modification in the structure of the wheel drive mechanism of FIG. 2.

In FIG. 1, there is shown a wheel drive mechanism 10 constructed in accordance with the invention and being mounted within a wheel assembly 12. The wheel assembly 12 includes a drum 14 which is provided with a hub 16. The hub 16 is rotatably mounted by means of a pair of axially aligned roller bearing assemblies 18 and 20 on a support member or cannon 22. The cannon 22 is mounted within a hub 24 which is secured in conventional manner to the frame of an automotive vehicle (not shown).

The cannon 22 is secured against both rotational and axial movement with respect to the hub 24. In order to prevent rotational movement of the cannon, a tapered spline connection to the hub 24 is provided as seen at 26. A retainer plate 28 is secured by connector members 30 to the inner end of the cannon. The plate 28 abuts to the inner-end surface of the hub 24 and thus serves to prevent outward axial movement of the cannon.

Mounted on the cannon 22 adjacent the outer end thereof is a hub 32 (see also FIG. 2). The hub 32 provides a central collar portion 34 which is splined to the cannon as seen at 35. The collar portion 34 is retained in position on the cannon by a retainer plate 36, secured by connector members 38 to the inner end of the cannon. Associated with each of the connector members 38 is a shim 40 positioned between the plate 36 and the inner end of the cannon. The bearing assembly 18 is positioned in abutment with the outer end of the hub 24, the bearing assembly 20 being positioned in abutment with the collar portion 34. The plate 36 bears tightly against the collar portion 34 so as to preload the bearing assemblies 18, 20. Inward axial movement of the cannon is thus prevented.

Mounted within the wheel assembly 12 is an internal ring gear 42. Secured to the ring gear 42 by means of bolts 44 and locks 46 are a plurality of mounting plates 48. The plates 48 are received in a groove 50 formed in the peripheral surface of the hub 32 for support of the ring gear 42. The hub 32 is formed at its periphery with a plurality of teeth 52 which engage the teeth 54 of the ring gear 42 for preventing rotational movement of the latter.

Extending through the bore 56 of the cannon is a rotatable axle shaft 58. The shaft 58 is driven at its inner end (not shown) in conventional manner, by a motor or gear train, within the vehicle housing. Adjacent its outer end, the shaft 58 is supported by bearings 59, positioned within a bore 60 formed in the plate 36. The outer end portion of the shaft 58 is of enlarged diameter as seen at 61. Mounted on the enlarged shaft portion 61 by means of a spline connection 62 is a sun gear 64. The sun gear 64 is maintained in position on the shaft portion 61 by means of a snap ring 66 and a thrust washer 68. The snap ring 66 is mounted on the shaft portion 61 adjacent the outer end thereof. The thrust washer 68 is positioned between the sun gear 64 and the retainer plate 36.

Mounted in conventional manner within the ring gear 42 is a rotatable planet gear carrier 70. The carrier 70 is positioned laterally with respect to the plate 36 by means of a thrust washer 72. Mounted on the carrier 70 are a plurality of stub shafts 74. Each of the shafts is secured in position by means of an attachment plate 76. Each of the plates 76 is received within a slot 78 formed at the peripheral surface of the respective shaft 74. Each plate 76 is secured to the carrier 70 by connector members 80.

Rotatably mounted on each of the shafts 74 by means of a suitable bearing 82 is a planet gear 84 having teeth 86. Each planet gear 84 is positioned for meshing of the teeth 86 thereof with the teeth 54 of the ring gear 42 and with the teeth 88 of the sun gear 64.

The carrier 70 is formed at its center with an internal ring gear 90. The ring gear 90 provides teeth 92 which mesh with the teeth 94 of a second sun gear 96. The sun gear 96 is rotatably mounted by means of bearings 98 on a stub shaft 100. The shaft 100 is formed integrally with a cover plate 102. A snap ring 104 serves to maintain the bearings 98 in position on the shaft 100. A thrust washer 106 is positioned between the sun gear 96 and the sun gear 64. A further thrust washer 108 is positioned between the sun gear 96 and the cover 102. A button 110 is mounted on the end of the stub shaft 100 and serves to prevent the drive shaft 58 from moving axially outward.

The cover plate 102 is secured by means of cap screws 112 to a planet gear carrier 114. The carrier 114 mounts a plurality of stub shafts 116 each secured in position by means of a snap ring 118. Rotatably mounted on each of the stub shafts 116 by bearings 120 is a planet gear 122. Each of the planet gears 122 provides teeth 124 which mesh with the teeth 94 of the sun gear 96 and with the teeth 54 of the ring gear 42. The carrier 114 is secured by means of connector members 126 to the drum 14.

The drum 14 provides a sump 128 which contains lubricating oil. Suitable bores 130 are formed in each of the stub shafts 74 for lubrication of the associated bearings 82. Similar bores 132 are formed in each of the stub shafts 116 for lubrication of the associated bearings 120. The sun gear 96 is formed with a series of bores 134 which facilitate lubrication of the bearings 98. An oiler 136 is mounted on the plate 36. The oiler 136 is designed to collect oil thrown off from the gears of the mechanism 10 for lubrication of the bearings 59.

In the operation of the wheel drive mechanism 10, the axle shaft 58 is rotated in conventional manner and serves to rotate the sun gear 64. As a consequence, the planet gears 84 are caused to rotate. Since the teeth 86 of the latter engage the teeth 54 of the stationary ring gear 42, the carrier 70 is thus caused to rotate.

The rotational movement of the carrier 70 is transmitted through the inter-engaged teeth 92 and teeth 94 to the sun gear 96. The latter in turn produces rotation of the planet gears 122. Since the teeth 124 of the planet gears 122 engage the teeth 54 of the stationary ring gear 42, the carrier 114 is thus caused to rotate. Since the carrier 114 is connected to the drum 14 by the members 126, rotation of the wheel assembly 12 is then produced.

In FIG. 3, there is shown a modification of the invention with respect to the manner of mounting of the sun gear 64. Here the draft shaft 58' is formed adjacent its outer end with a spline 62'. Mounted on the shaft 58' and engaging the spline 62' is a sleeve 138. The sleeve 138 is maintained in position on the shaft 58' by a snap ring 140. A sun gear 64' is mounted on the sleeve 138 and is secured to the latter by a spline connection 142. A snap ring 144 serves to maintain the sun gear 64' in mounted position.

In FIG. 4, there is shown a modification of the invention with respect to manner of mounting of the sun gear 96. Here a sun gear 96" is positioned by means of thrust washers 106" and 108" between the sun gear 64" and the shoulder portion 101". The sun gear 96" is free to float between the planet gears 122". The sun gear 96" when rotated by the ring gear 90" may thus seek the best path of rotation.

The wheel drive mechanism 10 provides a number of advantages as compared to the wheel drive mechanisms of the prior art. As one advantage thereof, the drive mechanism 10 is relatively compact, and is positioned entirely within the drum 14.

As a further advantage thereof, the drive mechanism 10 is relatively easily inspected and serviced. This results particularly from the fact that the drive mechanism 10 is located at the outboard side of the wheel assembly 12.

As another advantage of the drive mechanism 10, the latter is relatively resistant to damage. A particular feature which contributes to this advantage is the spline connection 35 between the cannon 22 and the hub 32. As compared to the gear connections of the prior art, this fixed spline connection provides increased resistance to damage.

As an additional advantage of the wheel drive mechanism 10, the latter need not be disassembled when it is desired to transport the wheel assembly 12. Through the provision of the spline connection 62 or the removable sleeve 138, the drive mechanism 10 can then be easily separated as a unit from the wheel assembly 12.

While offering the above discussed advantages, the wheel drive mechanism 10 at the same time can be designed to provide a high torque capacity. For example, when the drive mechanism 10 is associated with an axle shaft 58 which rotates at a speed as high as 800 r.p.m., a torque capacity of 350,000 ft. lbs. may be provided.

I claim:
1. A wheel drive mechanism, comprising
   (a) an internal ring gear adapted to be non-rotatably mounted within a wheel assembly;
   (b) a first sun gear mounted within said ring gear and adapted for rotation by a driven axle shaft;
   (c) a first rotatable carrier adapted to mount a set of planet gears and being formed with a drive gear;
   (d) a first set of planet gears rotatably mounted on said first carier, each planet gear meshing with said first sun gear and with said ring gear;
   (e) a second sun gear rotatably mounted within said ring gear and engageable by said drive gear;
   (f) a second rotatable carrier adapted to mount a set of planet gears;
   (g) a second set of planet gears, rotatably mounted on said second carrier, each planet gear of said second set meshing with said second sun gear and with said ring gear;
   (h) means for securing said second carrier to said wheel assembly for rotation of said wheel assembly;
   (i) said ring gear being adapted to be mounted on a support member for said wheel assembly;
   (j) and said first sun gear being adapted to be splined to said axle shaft, the splines being formed on an enlarged end of the shaft to permit disassembly of the shaft through the hub of the gear;
   (k) a plurality of stub shafts non-rotatably mounted on each of said first and second carriers, each of said planet gears being mounted on one of said stub shafts, the stub shafts mounted on said first carrier being formed with a slot;
   (l) and an attachment plate received in each of said slots and secured to said first carrier.

2. A wheel drive mechanism in accordance with claim 1 in which a cover plate is secured to said second carrier, a stub shaft being mounted on said cover plate, said second sun gear being mounted on said stub shaft.

References Cited

UNITED STATES PATENTS

| | | | |
|---|---|---|---|
| 3,150,532 | 9/1964 | Bixby | 74—391 |
| 1,489,384 | 4/1924 | Church | 74—391 |
| 1,768,225 | 6/1930 | Whitney. | |
| 2,529,330 | 11/1950 | Double | 74—801 |
| 2,998,735 | 9/1961 | Elfes | 74—801 |
| 3,059,505 | 10/1962 | Reicks | 74—801 |
| 3,221,832 | 12/1965 | Holmstrom. | |
| 3,255,840 | 6/1966 | Tangen. | |
| 3,382,958 | 5/1968 | Fagel. | |
| 3,387,502 | 3/1966 | Le Tourneau | 74—391 |

FOREIGN PATENTS

Ad. 79,251  10/1962  France.

ARTHUR T. McKEON, *Primary Examiner.*

U.S. Cl. X.R.
74—801; 180—43